United States Patent
Paro (10) Patent No.: US 10,077,030 B2
(45) Date of Patent: Sep. 18, 2018

(54) COMBINATION CLEANING TOOL WITH FLEXIBLE HEAD

(71) Applicant: Jacob Paro, Apple Valley, MN (US)

(72) Inventor: Jacob Paro, Apple Valley, MN (US)

( * ) Notice: Subject to any disclaimer, the term of this patent is extended or adjusted under 35 U.S.C. 154(b) by 0 days.

(21) Appl. No.: 15/189,889

(22) Filed: Jun. 22, 2016

(65) Prior Publication Data
US 2016/0355161 A1  Dec. 8, 2016

Related U.S. Application Data

(63) Continuation-in-part of application No. 14/086,722, filed on Nov. 21, 2013, now abandoned.

(51) Int. Cl.
| | |
|---|---|
| *B60S 3/04* | (2006.01) |
| *B08B 3/04* | (2006.01) |
| *B08B 1/00* | (2006.01) |
| *A47L 13/11* | (2006.01) |
| *A47L 13/12* | (2006.01) |
| *A47L 13/16* | (2006.01) |
| *A47L 13/26* | (2006.01) |
| *A47L 13/22* | (2006.01) |
| *A47L 13/257* | (2006.01) |

(52) U.S. Cl.
CPC ............... *B60S 3/047* (2013.01); *A47L 13/11* (2013.01); *A47L 13/12* (2013.01); *A47L 13/16* (2013.01); *A47L 13/22* (2013.01); *A47L 13/257* (2013.01); *A47L 13/26* (2013.01); *B08B 1/001* (2013.01); *B08B 3/04* (2013.01)

(58) Field of Classification Search
None
See application file for complete search history.

(56) References Cited

U.S. PATENT DOCUMENTS

| | | |
|---|---|---|
| 1,251,036 A | 12/1917 | Ilse |
| 2,469,060 A * | 5/1949 | Vosbikian ............. A47L 13/257 |
| | | 15/119.2 |
| 2,689,369 A | 9/1954 | Biek |
| 2,716,770 A | 9/1955 | Caldwell et al. |
| 2,814,822 A | 12/1957 | Page |
| 2,893,044 A | 7/1959 | Kurose |
| 3,229,317 A | 1/1966 | Linenfelser |
| 3,526,918 A | 9/1970 | Leland |
| 3,603,692 A | 9/1971 | Ball |
| 3,711,679 A | 1/1973 | Moschkau et al. |
| 3,724,017 A | 4/1973 | Mallory |
| 3,754,831 A | 8/1973 | Hutter |
| 4,716,616 A | 1/1988 | Poon |

(Continued)

FOREIGN PATENT DOCUMENTS

| | | |
|---|---|---|
| GB | 919745 A | 2/1963 |
| JP | 2006314662 A | 11/2006 |

(Continued)

*Primary Examiner* — Nicole Blan
(74) *Attorney, Agent, or Firm* — Craig J. Lervick; Larkin Hoffman Daly & Lindgren, Ltd.

(57) ABSTRACT

A new combination cleaning tool construction wherein the same can be utilized for cleaning surfaces, in particular, glass surfaces such as windshields. In particular the invention described herein provides a new combination cleaning tool construction wherein the same can be utilized for cleaning surfaces, in particular, glass surfaces such as windshields or the like, with corner portions.

25 Claims, 12 Drawing Sheets

(56) References Cited

U.S. PATENT DOCUMENTS

| | | | |
|---|---|---|---|
| 4,893,370 A | | 1/1990 | Klotz |
| D305,868 S | | 2/1990 | Westall |
| 5,251,351 A | | 10/1993 | Klotz |
| 5,429,678 A | | 7/1995 | Fany |
| 5,519,911 A | * | 5/1996 | Callander .................. A47L 1/08 15/114 |
| 5,539,951 A | | 7/1996 | Guell et al. |
| 5,666,685 A | | 9/1997 | von Grolman et al. |
| 5,819,365 A | * | 10/1998 | Huffman .................... A47L 1/08 15/321 |
| 5,987,685 A | * | 11/1999 | Lambert .................... A47L 1/06 15/118 |
| 8,166,606 B2 | | 5/2012 | Johnson et al. |
| 8,375,500 B1 | * | 2/2013 | Aguirre .................... B25G 1/04 15/121 |
| 2002/0174502 A1 | | 11/2002 | Cioci |
| 2004/0255427 A1 | | 12/2004 | Gavney, Jr. |
| 2005/0273956 A1 | | 12/2005 | Boggess |
| 2006/0251465 A1 | | 11/2006 | Savoia, Sr. et al. |
| 2007/0169302 A1 | | 7/2007 | Madhala |
| 2009/0185851 A1 | | 7/2009 | Mapalo et al. |
| 2010/0115723 A1 | | 5/2010 | Mapalo et al. |
| 2012/0079666 A1 | * | 4/2012 | Orubor .................... A47L 1/08 15/105 |
| 2013/0008464 A1 | | 1/2013 | Varner |

FOREIGN PATENT DOCUMENTS

| | | | |
|---|---|---|---|
| WO | 2005007470 A3 | 1/2005 | |
| WO | 2016081007 A1 | 5/2016 | |

\* cited by examiner

COMBINATION CLEANING TOOL WITH FLEXIBLE HEAD

CROSS-REFERENCE TO RELATED APPLICATIONS

This application claims to priority to non-provisional application Ser. No. 14/086,722 filed on Nov. 21, 2013, herein incorporated by reference in its entirety.

BACKGROUND

The use of windshield cleaning tools is known in the prior art. More specifically, windshield cleaning tools heretofore devised and utilized are known to consist basically of familiar, expected and obvious structural configurations, notwithstanding the myriad of designs encompassed by the crowded prior art which have been developed for the fulfillment of countless objectives and requirements. Some examples of known cleaning tools include those found in U.S. Pat. Nos. 3,938,535; 4,893,370; U.S. Pat. No. Des. 327,146; U.S. Pat. Nos. 3,307,212; 913,304; and 5,363,528. While these devices fulfill their respective, particular objectives and requirements, the aforementioned patents do not disclose a combination cleaning tool having a resiliently flexible head that can conform to varying surface geometries or configurations while returning to its resting, linear configuration.

Therefore, there is a need for a device that includes an elongate resiliently flexible blade and a resiliently compressible sponge member that form a flexible head portion. Ideally, the sponge member includes an abrasive material for scrubbing debris off of a surface. There is further a need for a combination cleaning tool that provides an apparatus primarily developed for the purpose of cleaning surfaces, in particular, glass surfaces such as windshields which typically include corners that cannot be cleaned by the aforementioned cleaning tools. There is also a need for the apparatus to be configurable to clean other surfaces, such as floors and walls that include corner portions.

SUMMARY

A combination cleaning tool of the present invention substantially meets the aforementioned needs by addressing the foregoing disadvantages inherent in existing windshield cleaning tools. In an embodiment, the invention disclosed and described herein provides a new combination cleaning tool construction wherein the same can be utilized for cleaning surfaces, especially glass surfaces such as windshields. In particular the invention described herein provides a new combination cleaning tool construction wherein the same can be utilized for cleaning surfaces, in particular, glass surfaces such as windshields or the like, with corner portions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood in view of the detailed description and referred drawings wherein.

DETAILED DESCRIPTION

Figure 1:
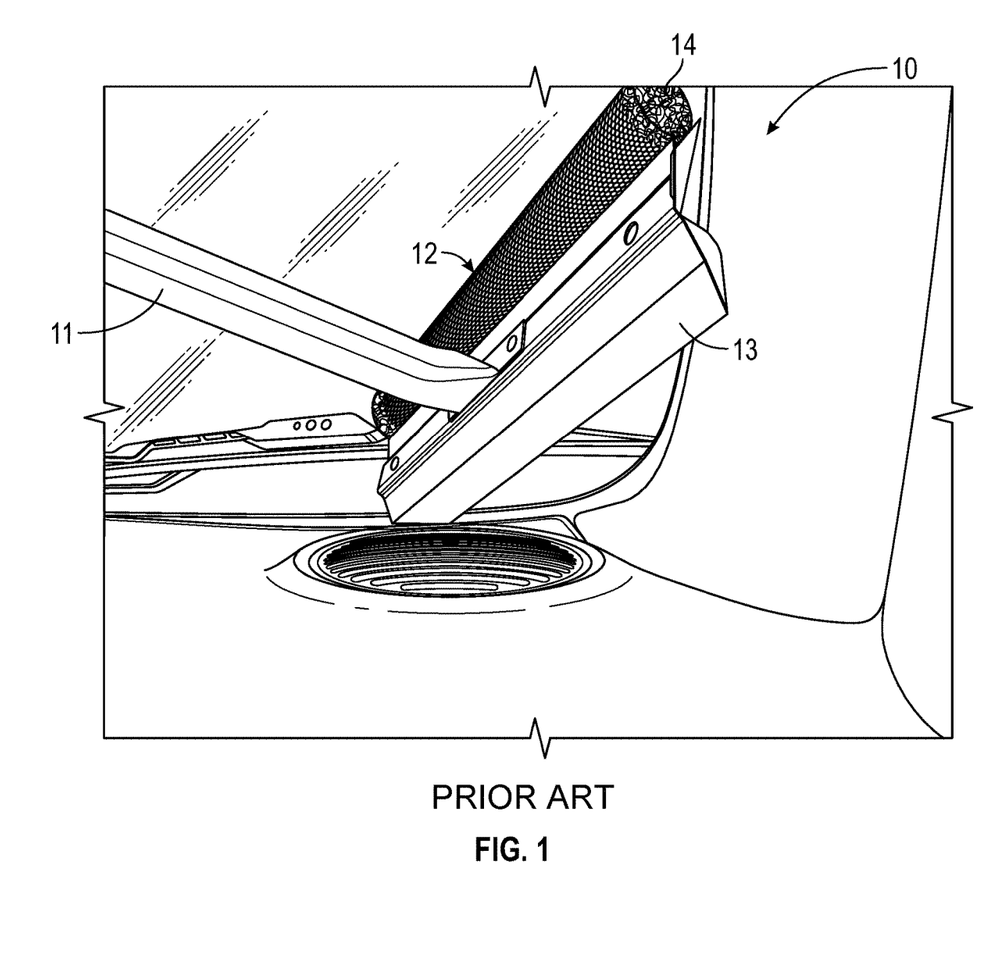
FIG. 1 is a perspective view of a prior art squeegee and cleaning tool.

With reference now to the drawings, and in particular to FIG. 1, a cleaning tool is shown by reference numeral 10. Rigid cleaning tools 10 of the prior art generally comprise a handle 11 with an inflexible head portion 12 coupled to the proximal end 30 of handle 11. An elongate flexible squeegee blade 13 is coupled to the inflexible head portion 12. Inflexible head portion 12 generally comprises a sponge member 14.

Figure 2:
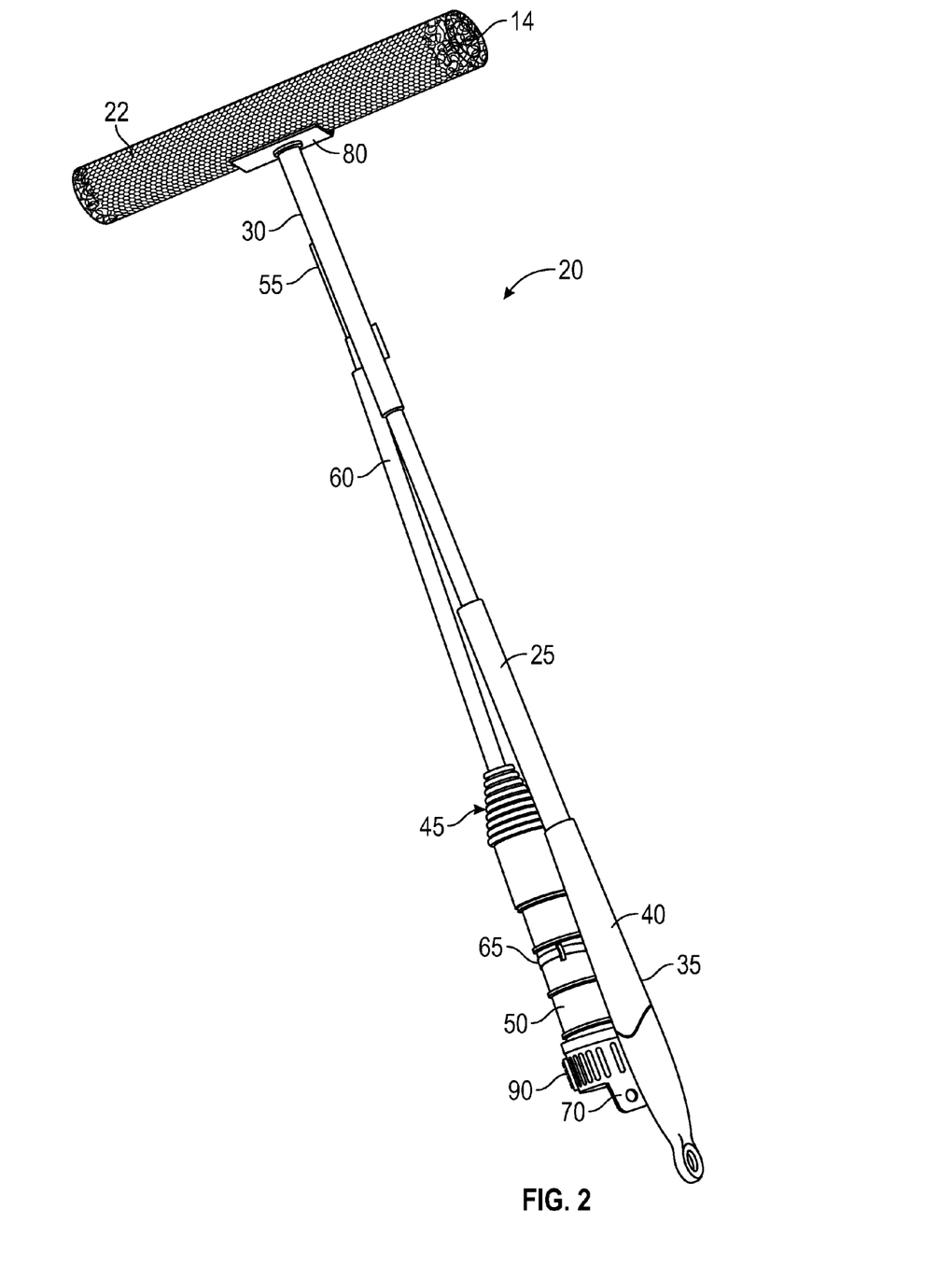
FIG. 2 is a perspective view of one embodiment of a cleaning tool.
Figure 3:
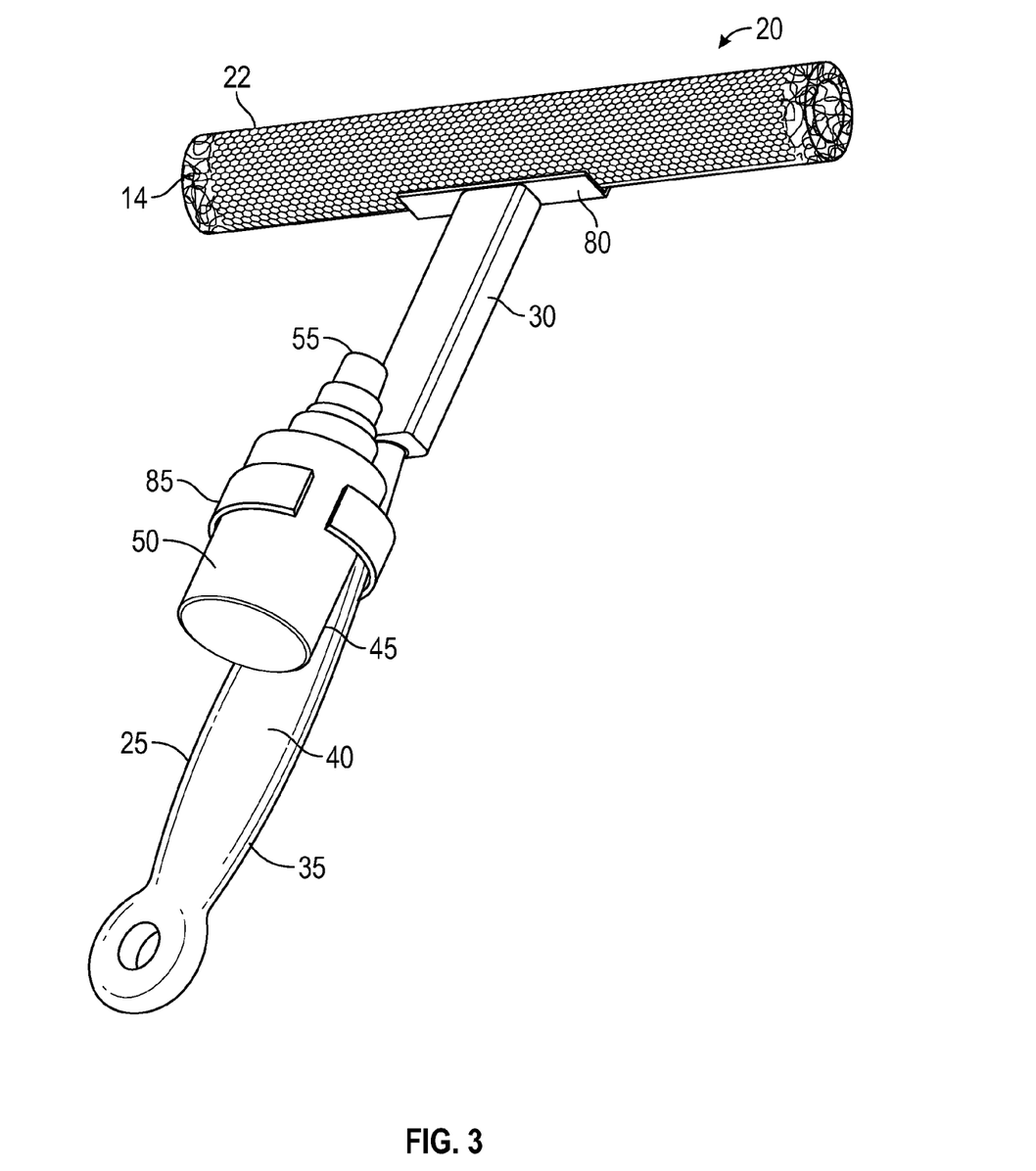
FIG. 3 is a perspective view of one alternative embodiment of a cleaning tool.
Figure 4:
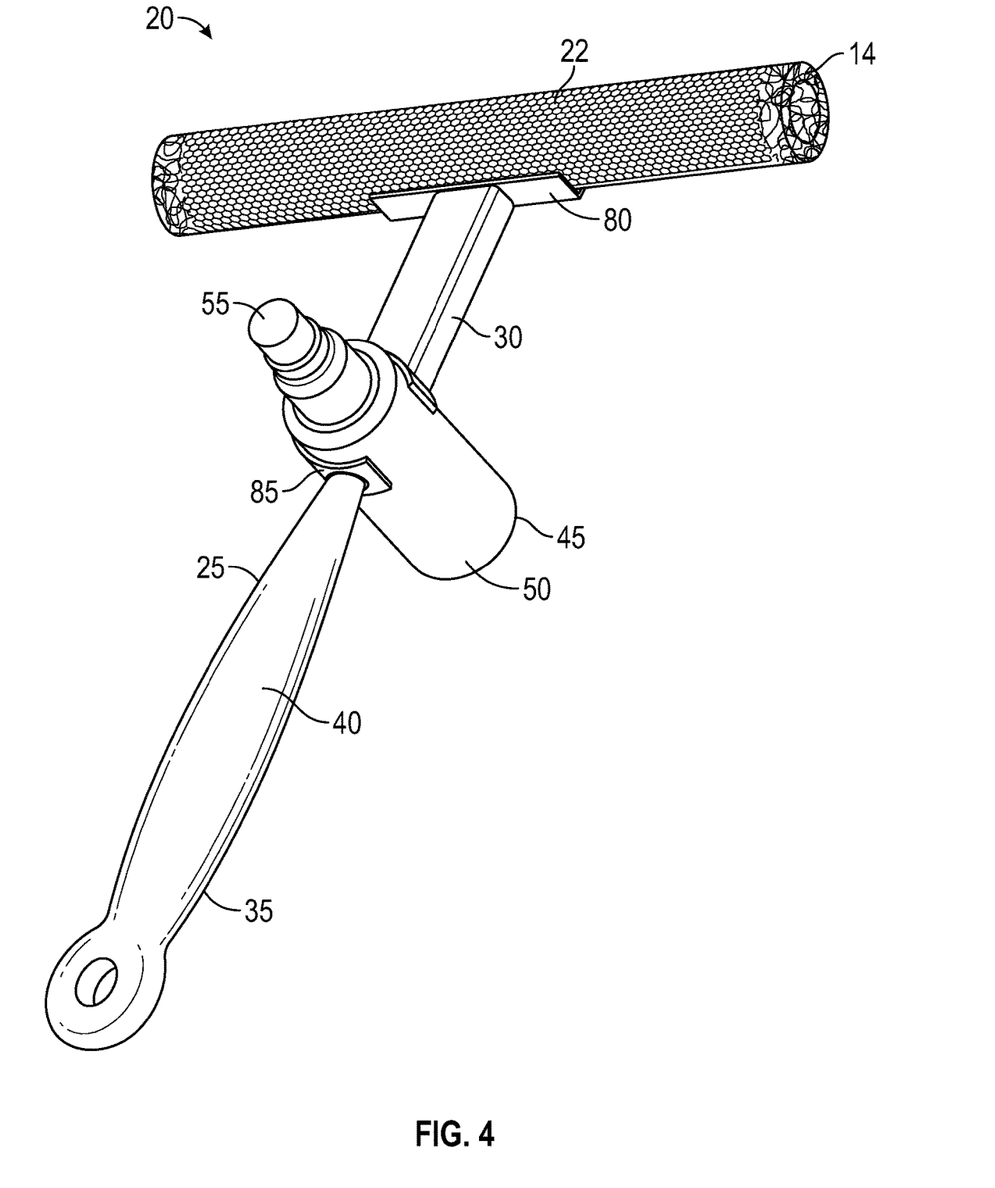
FIG. 4 is a perspective view of one alternative embodiment of a cleaning tool.
Figure 5:
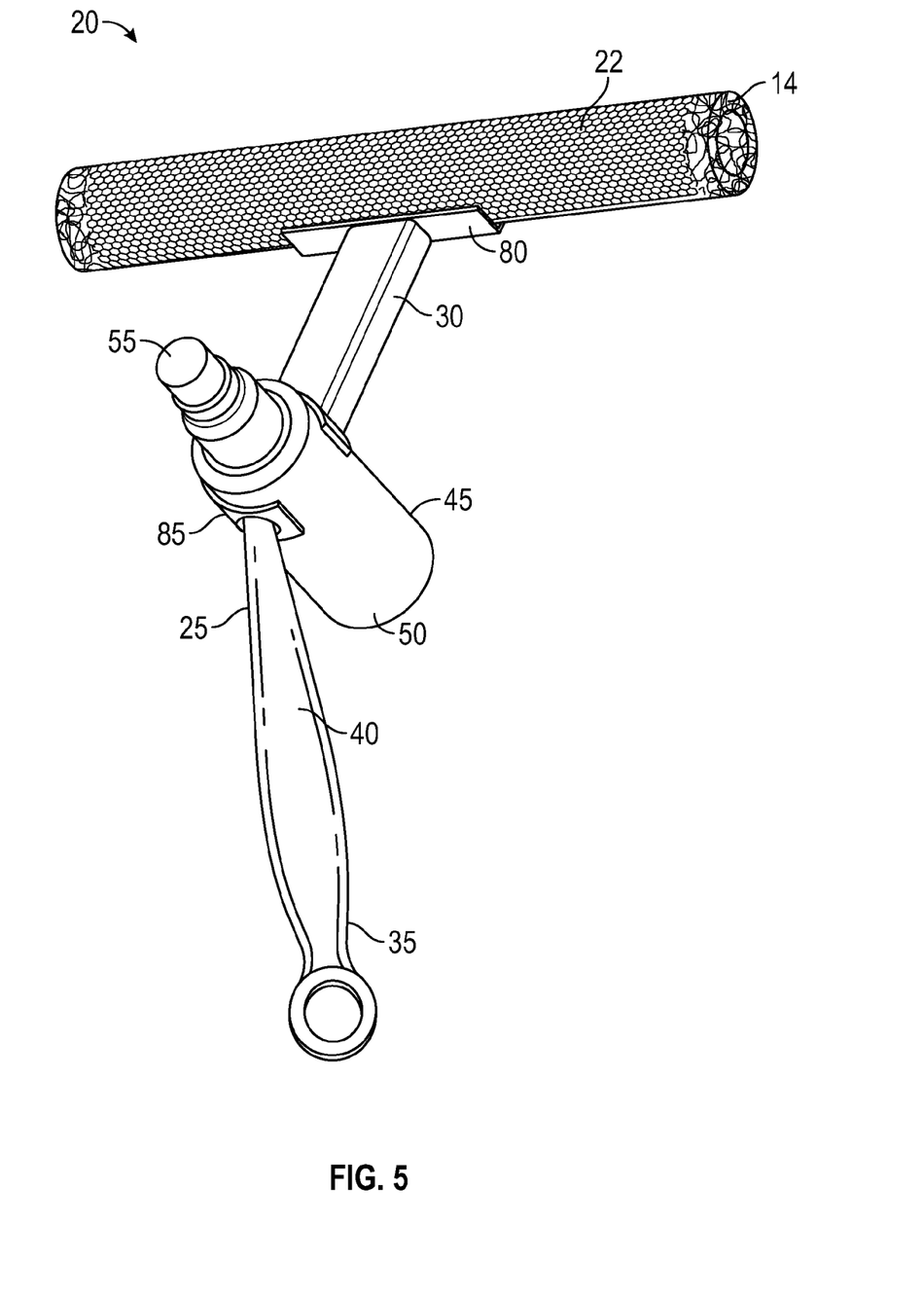
FIG. 5 is a perspective view of one alternative embodiment of a cleaning tool.

Referring now to FIGS. 2-12, several example embodiments of a resilient cleaning tool 20 are shown. Cleaning tool generally includes a handle 25 having a proximal end 30 and an opposed distal end 35 and a longitudinal axis extending therebetween. The handle 25 has a length defined between proximal end 30 and distal end 35 of the handle 25 preferably greater than about 6 inches. Referring to FIG. 2 where handle 25 is at least about 12 inches in length. In this example embodiment, handle is between 12 and 36 inches in length. In a preferred embodiment, handle will be about 24 inches in length. Referring now to FIGS. 3-5 where handle is between about 6 inches and 12 inches in length. In other embodiments (not shown), handle includes at least one, or a plurality, or articulable joints. In this manner, the position of head portion 22 with respect to proximal end 30 of handle 25 can be customized in accordance with user preference.

It should also be appreciated that handle 25 may include a telescopic portion to allow cleaning tool 20 to extend the length of handle 25. In these example embodiments the telescoping function may be initiated by any number of known means. In one exemplary embodiment, fastening ring disposed on the outer circumference of handle 25 may be loosened, thereby extending handle 25. Once the handle portion is released to a sufficient length, fastening ring may be tightened to secure the extended handle while the cleaning tool is in use. In other related embodiments, a telescoping handle assembly includes an inner and outer telescoping handle sections. The inner section has an outer surface positioned along a substantial portion of the inner surface of outer section. The outer section may optionally include locking teeth that are fixed axially in position along the length of the outer section and that are resiliently movable between a locked condition disposed in one of the grooves on the inner section and an unlocked condition.

In other related embodiments, handle assembly includes a locking sleeve movable in a first rotational direction to apply inwardly directed force to prevent telescopic movement of the inner section relative to the outer section. The locking sleeve is movable in a second rotational direction, opposite the first direction, to enable the telescopic movement of the inner section relative to the outer section.

Referring again to FIGS. 2-5, handle 25 is shown with a cylindrical outer configuration and a circular or oval transverse cross section. As best shown in FIGS. 2-4, handle 25 is generally perpendicular to the longitudinal axis of the handle 25. Although handle 25 could be configured with an angle as shown in FIG. 5. The relative angle, style and design are within the knowledge of one of ordinary skill in the art. Turning again to FIGS. 2-5 where handle 25 has a gripping portion 40 adjacent the distal end 35 of the handle 25. The gripping portion 40 is designed for grasping by a hand of a user. In preferred embodiments, the gripping portion 40 may include an ergonomic design to improve the relative ease at which a user can grasp gripping portion 40 to reduce unnecessary strain for the user.

Resilient cleaning tool 20 may also include a spray pump 45 which generally includes a reservoir 50 and a nozzle 55 in fluid communication with a conduit tubing 60. FIG. 2 shows when example embodiment of spray pump 45 where reservoir 50 is mechanically coupled to handle 25 via a bracket 65. It should be appreciated that the type of securement means are well know to those skilled in the art. Still referring to FIG. 2, reservoir 50 can be refilled by removing lid 70 and placing a cleaning solution therein. Nozzle 55 is moveably attached to handle 25 to allow a user to position nozzle 55 adjacent sponge member 14.

As shown in FIGS. 3-5, reservoir 50, nozzle 55 and conduit tubing (located in the internal cavity of reservoir 50) are similar to that of a hairspray pump. Reservoir 50 is attached to handle 25 via a generally medial clasp 85 to allow a user to removeably attach reservoir 50. This removable feature allows for a user to conveniently refill or replace reservoir 50 when needed. Turning specifically to FIG. 3 which shows spray pump 45 in a generally parallel configuration relative to handle 25. Alternatively, FIGS. 4 and 5, describe a spray pump 45 in a generally perpendicular configuration relative to handle 25.

Figure 8:
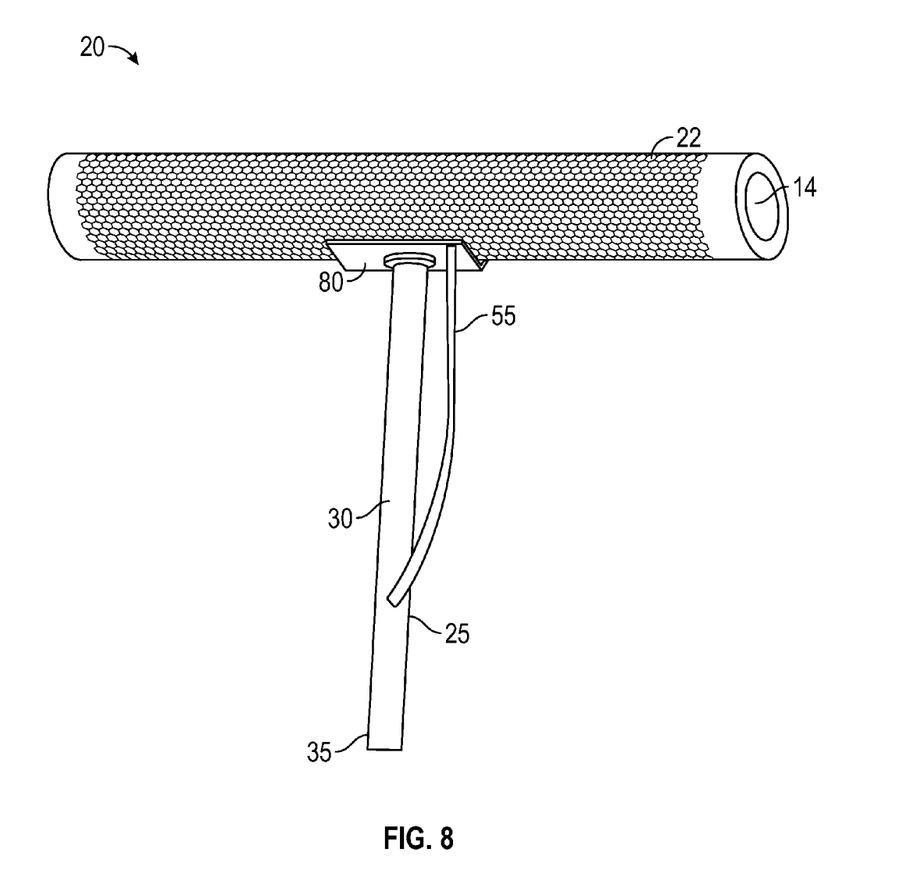
FIG. 8 is a perspective view of a head portion and an external fluid delivery means.

Referring now to FIG. 8 which discloses nozzle 55 transverse through a surface of handle 25 in a manner that provides the terminal end of nozzle 55 to be adjacent to sponge member 14. In at least this example embodiment, nozzle 55 is positioned in a manner to spray sponge member 14 to provide sufficient wetting to allow a user to clean the interior surface of a window or other surface in need thereof. It should be appreciated that this close proximity is also advantageous as the spray pump does not need to use excess cleaning solution to achieve a clean surface. Although FIG. 8 is shown with nozzle 55 adjacent to sponge member 14, the precise location and orientation may vary. In one alternative embodiment, nozzle 55 is positioned in a manner that will allow nozzle to be directed toward an area above (or below) head portion 22 which will allow the cleaning solution to be directly sprayed on a surface needing to be cleaned.

Figure 6:
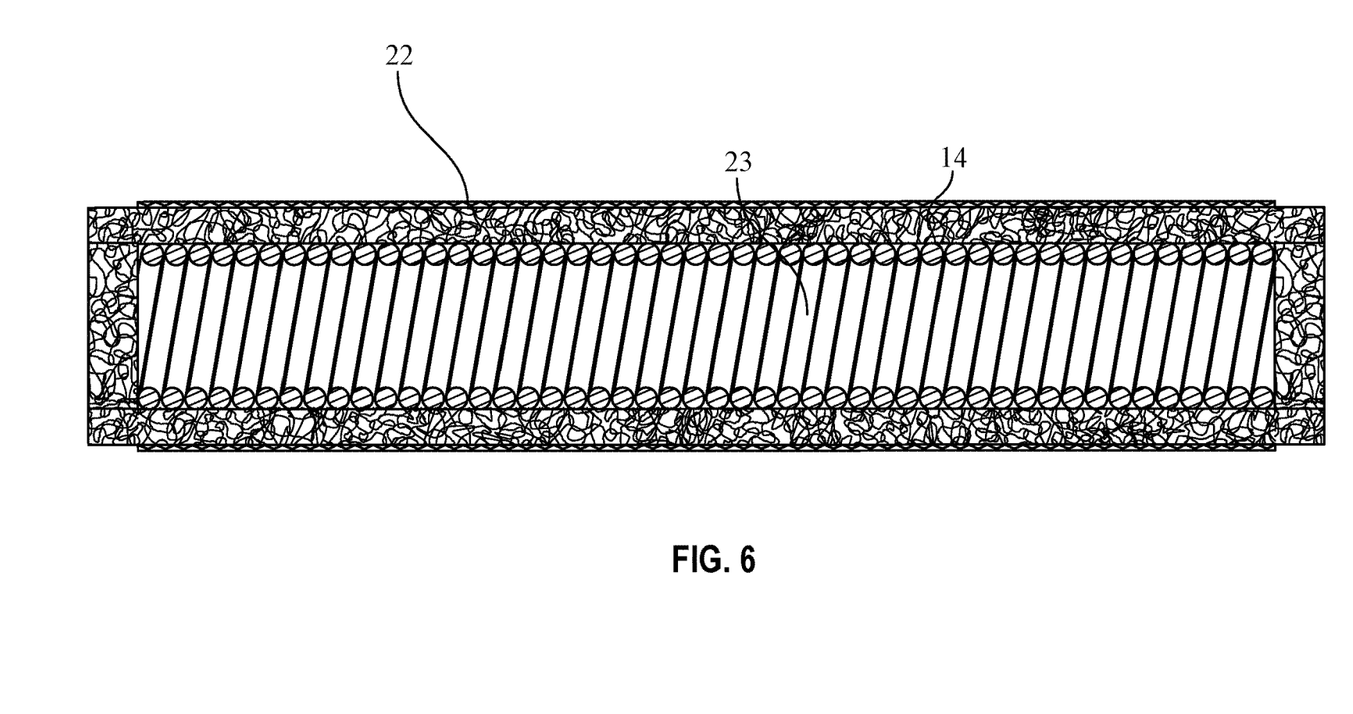
FIG. 6 is a top plan cross-sectional view of the head portion of a cleaning tool.
Figure 7:
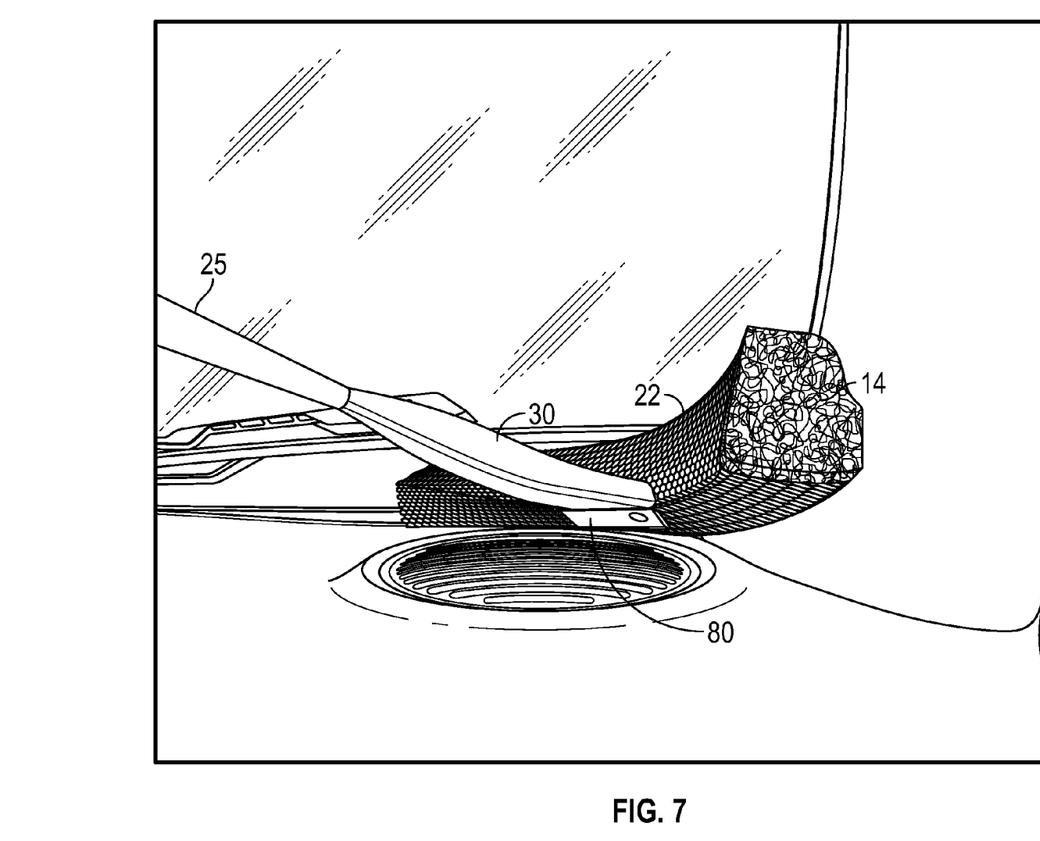
FIG. 7 is a perspective view of a portion of one embodiment of a cleaning tool.

Referring now to FIGS. 2-8 where various views and embodiments of a flexible head portion 22 are shown. Flexible head portion 22 is coupled to the distal end 35 of handle 25. Preferably, the head portion 22 is generally configured in a manner that will include a pair of opposite ends 30, 35, and a longitudinal axis extending therebetween. Flexible head portion 22 is illustrated showing a substantially perpendicular relationship with proximal end 30 of handle 25. Referring now to FIG. 6 which illustrates a cross-section view of head portion 22, which includes a biasing member 23 surrounded by sponge member 14. The cross-section of the head portion 22 is a structure that provides the flexibility to operate resilient cleaning tool 20 in corners and the like. As shown in FIG. 6, head portion 22 includes a biasing member 23, which is a spring. The head portion 22 structure should be sturdy enough to hold a generally horizontal position when not in use (i.e. FIGS. 2-5 and 8), but flexible to allow for use in corners and the like when sufficient force is applied (i.e. FIG. 7). Any material that will provide the resilient features of head portion 22 as described herein are within the scope of the invention.

The length of the sponge member 14 is substantially similar to the length of head portion 22. In other related embodiments, sponge member 14 is at most about equal in length to elongate member in use. In other embodiments, the length of sponge member 14 is about one-half the length of the handle 25. In another exemplary embodiment, the length of the head portion 22 is greater than about 4 inches to permit cleaning of an adequate amount of a windshield corner to be cleaned without the need for multiple passes.

The resilient cleaning tool 20 may optionally include a squeegee blade which is connected to the head portion 22. In use, the squeegee blade is designed for drawing across a surface to remove water from the surface. The squeegee blade ideally comprises a resiliently flexible rubber or plastic material. The squeegee blade has a pair of opposite ends and a length defined between the ends of the squeegee blade. The squeegee blade has a generally triangular cross section transverse the length of the squeegee blade. The length of the squeegee blade extends between the ends of the head portion. Preferably, the length of the squeegee blade is extended generally perpendicular to the longitudinal axis of the handle 25 and generally parallel to the longitudinal axis of the head portion 22.

In at least the embodiments described herein, the length of the optional squeegee blade extends across more than one-half of the length of the head portion 22. It should be appreciated that in order to support the squeegee action of removing water along a surface enough rigidity must be provided. In embodiments where a squeegee is desired, a head bracket 80 may also be used to provide a base structure for squeegee blade to be attached thereto. In at least these example embodiments, head bracket 80 is in mechanical communication with at least the proximal end 30 and/or head portion 22. In other related embodiments, squeegee blade is attached directly to head portion 22. The length of the squeegee blade extends across essentially the entire length of the head portion 22 or head bracket 80 depending on the desired configuration.

Sponge member 14 is coupled to the head portion 22 and is manufactured for absorbing fluid therein. The sponge member 14 has an exterior surface extending around the lateral ends of the head portion 22. The length of the sponge member 14 extends generally across the entire length of the head portion 22. The sponge member 14, as shown in FIGS. 2-8 has a generally semi-circular transverse cross section generally perpendicular to the longitudinal axis of the head portion 22. The transverse cross-section of the sponge member 14 preferably extends over a substantial portion of head portion 22. Preferably, the sponge member 14 has a fabric material, such as a mesh netting, over the exterior surface of the sponge member 14 adapted for aiding scrubbing off of debris from a surface, such as a window surface. Cleaning tool 20 may optionally include scrubbing pads.

Figure 9:
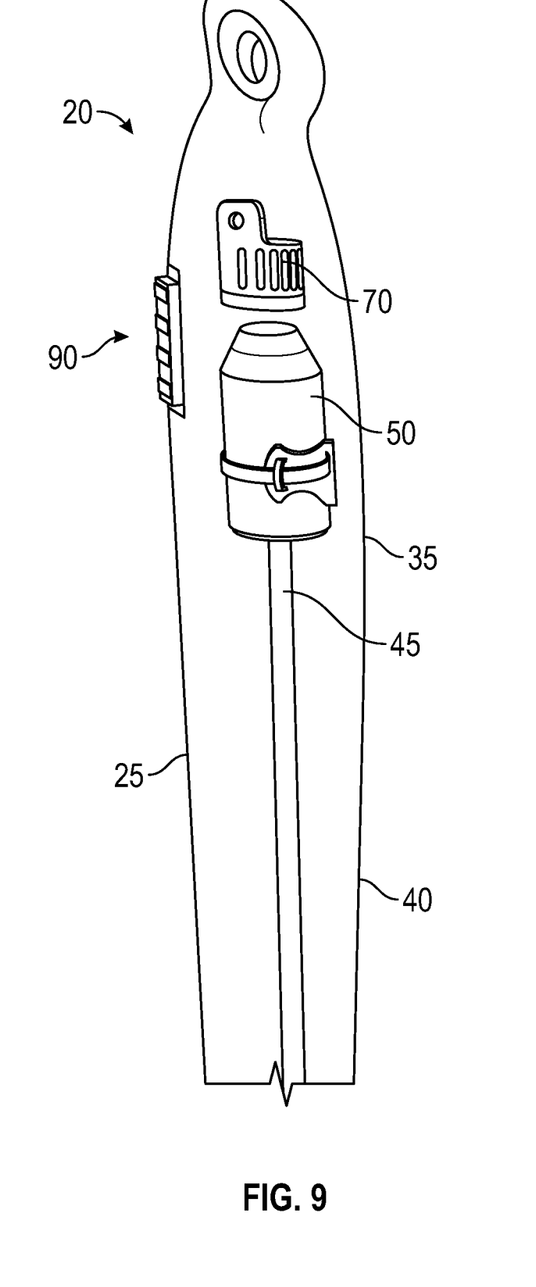
FIG. 9 is a cross-section view of a handle portion and an internally disposed pump.

Referring now to FIG. 9, which discloses a substantial portion of spray pump 45 located within the internal cavity of handle 25. In this embodiment, reservoir 50 is accessible by removing a portion of handle 25 from resilient cleaning tool 20 to access lid 70. Still referring now to FIG. 9, where the transverse cross-section of the gripping portion 40 has a diameter greater than a diameter of the transverse cross-section of the handle. Preferably, the distal end 35 of the handle 25 also has threaded bore (not shown) therein. The threaded bore is designed for threadably receiving a threaded end of a gripping portion 40 when access to the interior cavity of handle 25 is desired.

In use, the cleaning tool 20 is designed for cleaning surfaces, in particular glass surfaces such as a windshield, and also clean portions of these glass surfaces that may also include corners or bends that an inflexible head portion 12 cannot readily clean. Additional surfaces are also contemplated, such as floors, walls and mirrors.

In use, the sponge member 14 is soaked in a cleaning fluid such as water mixed with a soap detergent or windshield wiper fluid and then run over the windshield to wet the windshield. Sponge member 14, which is shown with a scrubbing fabric material covering sponge member 14 outer surface, is then rubbed over debris on the windshield to loosen and remove the debris from the windshield. Finally, the squeegee blade 75 is then run over the windshield to remove the fluid and loosen debris from the windshield.

In another exemplary use, resilient cleaning tool 20 will include a spray pump 45 that will spray a sufficient amount of cleaning solution onto (or into) sponge member 14 to allow for the cleaning of a surface. When a user desires to spray cleaning solution from nozzle 55, the user will activate spray pump 45 using a switch 90, as shown in FIGS. 2 and 9. Although no single application is preferred, switch 90 may activate spray pump 45 via electronic or manual means. In example embodiments utilizing an electric means resilient cleaning tool 20 may also be equipped with a battery.

As previously mentioned, nozzle 55 may be positioned in a manner that will allow nozzle to be directed toward an area above (or below) head portion 22 which will allow the cleaning solution to be directly sprayed on a surface needing to be cleaned. Head portion 22 is passed along surface and may also be pressed into corners and difficult to reach areas of a surface where the head portion 22 and sponge member 14 can clean the window, or surface, adjacent a frame structure.

Figure 10:
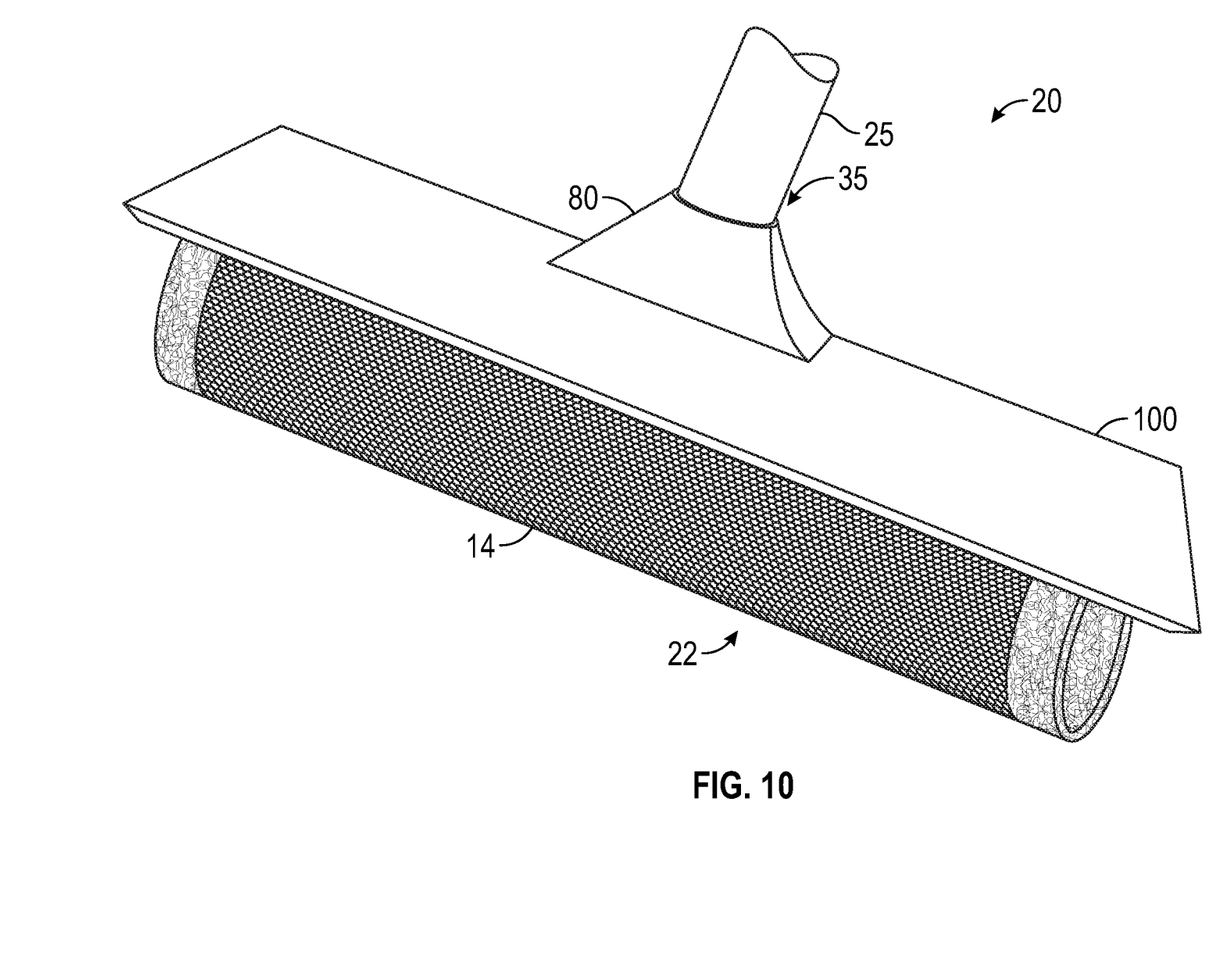
FIG. 10 is a perspective view of an embodiment of a cleaning tool.

Referring to FIG. 10, head portion 22 includes blade 100 and sponge member 14. Handle 25 is generally attached to head portion 22 with attachment bracket 80. As shown in FIG. 10, attachment bracket 80 may be integral with blade 100. However, bracket 80 may also be a separate component.

Figure 11:
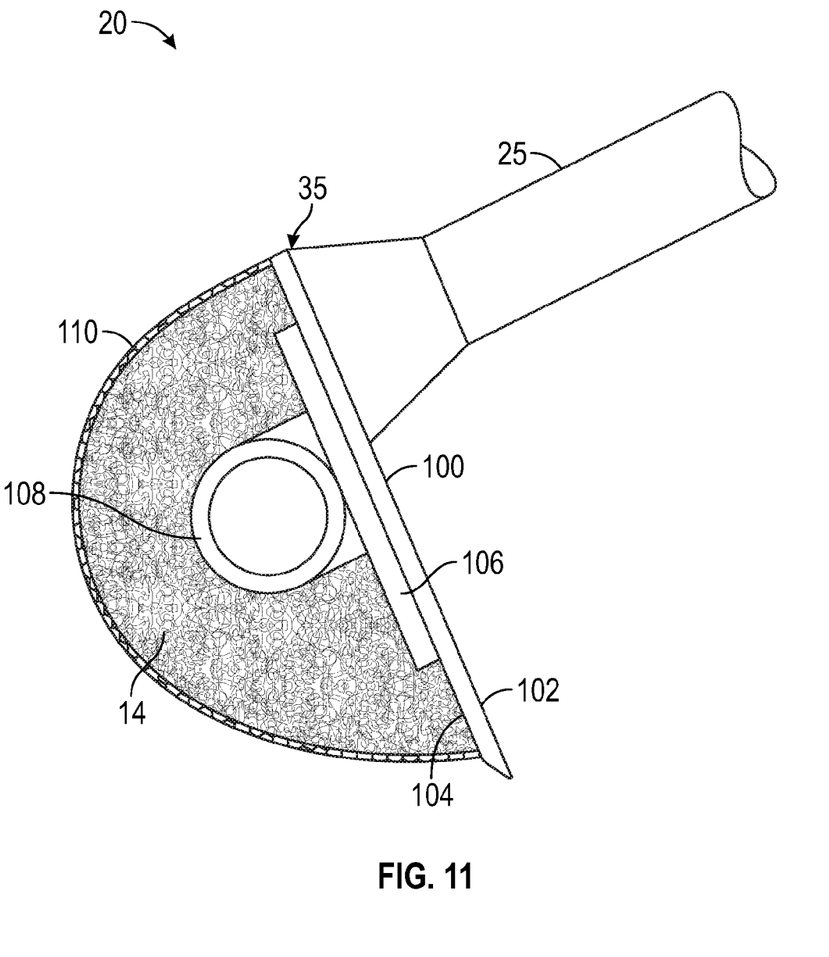
FIG. 11 is a side cross-sectional view of a cleaning tool according to an embodiment of the present invention.

Referring to FIG. 11, head portion 22 also includes stabilizing member 106. Stabilizing member 106 is generally attached to top surface 104 of blade 100, but may alternatively be attached to bottom surface 102 of blade 100. Though only one stabilizing member 106 is depicted, additional stabilizing members 106 may be added to achieve a desired amount of flexibility or rigidity of head portion 22. It is contemplated that these additional stabilizing members may be different lengths or widths, thus providing variable levels of flexibility and/or rigidity to selected sections of head portion 22. In an embodiment, sponge member 14 is attached at to and substantially about top surface 104 of blade 100, thereby at least partially surrounding stabilizing member 106. In an alternative embodiment, stabilizer member 106 is attached opposite sponge member 14 on bottom surface 102 of blade 100. Stabilizing member 106 may be coextensive with blade, and may have different dimensions.

As shown in FIG. 11, sponge member 14 has substantially semi-circular form. Though FIG. 11 depicts sponge member 14 as a single layer, sponge member 14 may include a plurality of overlapping layers. In general, handle 25 is attached to and extends away from bottom surface 102 of blade 100. In alternative embodiments, sponge member 14 is wrapped concentrically around biasing member 108 to form multiple layers of sponge member 14.

Stabilizing member 106 and blade 100 are generally made from the same or similar materials. In an embodiment, stabilizing member 106 is a modified blade 100. In other embodiments, blade 100 is a standard rubber squeegee blade, while stabilizing member 106 is made from a polymeric material (such as ABS or polypropylene) that is stiffer than the rubber material of blade 100.

As described above and further depicted in FIG. 11, head portion 22 may further include biasing member 108, such as a spring. Biasing member 108 provides additional support to head portion 22 while maintaining resiliency and flexibility. In an embodiment, biasing member 108 is a coil spring, though one skilled in the art will readily recognize that biasing member 108 may be any number of different types of springs, including a leaf spring or a rod made from a resilient polymeric material. As shown in FIG. 11, sponge member 14 is wrapped around and thereby at least partially surrounds biasing member 108 such that biasing member 108 is positioned between sponge member 14 and stabilizing member 106 (or between sponge member 14 and blade 100, as the case may be). In other embodiments, such as when sponge member is concentrically wrapped around biasing member 108, a portion of sponge member 14 is situated between biasing member 108 and blade 100 and/or stabilizing member 106. In an embodiment, mesh fabric 110, such as an abrasive, netting, is affixed to sponge member to enhance the ability of cleaning tool to remove debris from surfaces.

Biasing member 108 may be coated, wrapped in a plastic member or otherwise substantially sealed off from sponge member 14. In this manner, the corrosive effects resulting from oxidation of metallic biasing member 108 can be reduced.

The aforementioned construction provides several advantages. In an embodiment, sponge member 14 can be attached directly to blade 100 without the use of mechanical fastening members, particularly when head bracket 80 is integral with blade 100. Rather, the surface area presented by blade 100 facilitates the use of an adhesive material for attachment of sponge member 14. When made from a polymeric material, blade 100 may also be attached to sponge member 14 through plastic welding techniques.

Figure 12:
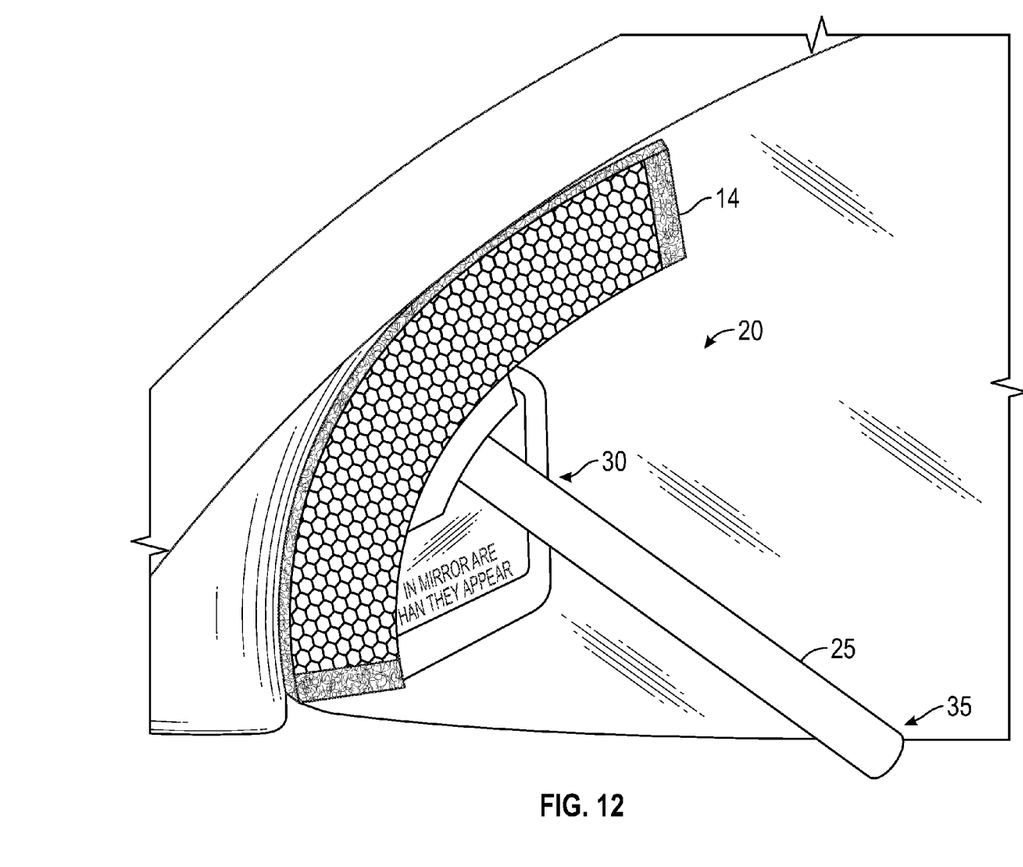
FIG. 12 is a depiction of an embodiment of a cleaning tool in operation.

Cleaning tool 20 can be used to clean surface having non-linear edges. Referring to FIG. 12, cleaning tool 20 is particular well-suited for cleaning the corners of glass surfaces, such as the interior surface of a car window. In particular, as head portion 22 encounters a non-linear edge, head portion 22 will assume a generally arcuate shape that substantially conforms to the non-liner edge. In an embodiment, head portion 22 of cleaning tool 20 can conform to an angle of between approximately 180 degrees and 60 degrees, or approximately 110 degrees. As cleaning tool 20 is removed from the surface, the inherent resiliency of biasing member 108 and blade 100 return head portion 22 to the resting, or linear, configuration shown in FIG. 10. The inherent resiliency of stabilizing member 106 can also the return of head portion 22 to its resting, or linear, configuration.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

I claim:

1. A cleaning tool comprising:
   a handle having a proximal end and a distal end; and
   a flexible head portion attached to said proximal end of said handle, said flexible head portion having a length and two opposing ends, said flexible head portion being oriented substantially perpendicular to said handle, and wherein said head portion is attached to said proximal end of said handle at a central portion thereof, and said flexible head portion having a predetermined level of flexibility wherein said opposing ends can be resiliently deflected a maximum predetermined distance, said head portion further comprising:
      a resiliently flexible blade presenting an upper surface and a lower surface;
      a sponge member attached adjacent said upper surface of said blade; and
      a flexible biasing member enclosed by said sponge member, wherein the resiliently flexible blade, the sponge member and the flexible biasing member are configured to selectively control the predetermined level of flexibility.

2. The cleaning tool of claim 1 wherein said flexible biasing member is a spring.

3. The cleaning tool of claim 2, wherein the biasing member is made from a non-corrosive material.

4. The cleaning tool of claim 2, wherein said flexible head portion further comprises a stabilizing member adjacent said blade.

5. The cleaning tool of claim 4, wherein said stabilizing member and said blade are substantially coextensive.

6. The cleaning tool of claim 4, further comprising a second stabilizing member positioned between the stabilizing member and the flexible blade member, said stabilizing member and said second stabilizing member further configured to provide said predetermined level of flexibility.

7. The cleaning tool of claim 6 wherein the stabilizing member and the second stabilizing member are modified blades and are sized to be smaller than the flexible blade member and contained within the flexible head portion, and wherein the flexible blade member extends outwardly beyond the sponge member, thereby providing a squeegee function.

8. The cleaning tool of claim 4 wherein the stabilizing member comprises a plurality of modified blades, with each of the plurality of modified blades being smaller than the flexible blade member.

9. The cleaning tool of claim 1, further comprising a head bracket attached to said proximal end of said handle, and wherein said head bracket is further attached to said flexible head portion.

10. The cleaning tool of claim 9, wherein a portion of said sponge member is positioned between said head bracket and said biasing member.

11. The cleaning tool of claim 1, wherein said sponge member is concentrically wrapped around said biasing member.

12. The cleaning tool of claim 1, wherein said flexible head portion is deflectable between a resting position wherein the head portion is substantially linear and a second position wherein the head portion is substantially arcuate, with the ends deflected some distance, up to the maximum predetermined distance.

13. The cleaning tool of claim 12, wherein said head portion is positionable to conform to a corner of a surface, said corner forming an angle of between approximately 180 degrees and approximately 60 degrees.

14. The cleaning tool of claim 1, wherein said head portion further comprises an abrasive netting cooperating with the sponge member to facilitate the removal of debris from a surface.

15. The cleaning tool of claim 14, wherein said abrasive netting is attached to a leading edge of said sponge member.

16. The cleaning tool of claim 1, further comprising
   at least one resiliently compressible abrasive pad for scrubbing debris off of a surface, said scrubbing pad being attached to the sponge member; and
   a spray pump having a reservoir, a nozzle and tubing in fluid communication between said reservoir and said nozzle;
   wherein said blade is an elongate flexible squeegee and said handle has a gripping portion adjacent said proximal end of handle.

17. The cleaning tool of claim 1 further comprising a spray device having a spray nozzle and reservoir, said spray device removably attached to said handle.

18. A method of cleaning and drying a surface, comprising:
   providing a cleaning device comprising:
      a handle having a proximal end and a distal end; and
      a flexible head portion attached to said proximal end of said handle, said flexible head portion having a length which is oriented substantially perpendicular to said handle, and wherein said head portion is attached to said handle at a central portion thereof, and said flexible head portion having ends which can be resiliently deflected a maximum predetermined distance, said head portion further comprising:
         a resiliently flexible blade presenting an upper surface and a lower surface;
         a sponge member attached adjacent said upper surface; and
         a flexible biasing member enclosed by said sponge member, wherein the resiliently flexible blade, the sponge member and the flexible biasing member are configured to selectively control the maximum predetermined distance that the ends can be deflected;

positioning said cleaning device along a corner of said surface;

conforming said head portion of said cleaning device to said corner of said surface; and cleaning and drying the surface.

19. The method of claim 18, further comprising:

removing said cleaning device from said corner of said surface, thereby causing said head portion to re-assume a substantially linear configuration.

20. The method of claim 18, wherein said corner forms an angle of between approximately 180 degrees and approximately 60 degrees.

21. The method of claim 20, wherein said flexible head portion further comprises a stabilizing member adjacent said blade.

22. The method of claim 21, further comprising a head bracket attached to said proximal end of said handle, wherein:

said head bracket is attached to said flexible head portion; and at least a portion of said sponge member is positioned between said head bracket and said biasing member.

23. A cleaning tool comprising:

a handle having a proximal end and a distal end; and a flexible head portion attached to said distal end of said handle; and a head bracket attached to said distal end of said handle and wherein said head bracket is further attached to said flexible head portion, said head portion being deflectable a predetermined distance between a resting position wherein the head portion is substantially linear and a second position wherein said head portion is substantially arcuate;

wherein head portion comprises:

a resiliently flexible blade presenting an upper surface and a lower surface;

a sponge member attached adjacent said upper surface of said blade; and a flexible biasing member enclosed by said sponge member such that said sponge member is positioned between said head bracket and said biasing member wherein the resiliently flexible blade, the sponge member and the biasing member are configured to selectively control the predetermined distance.

24. The cleaning tool of claim 23, further comprising at least one resiliently compressible abrasive pad for scrubbing debris off of a surface, said scrubbing pad being attached to the sponge member; and a spray pump having a reservoir, a nozzle and tubing in fluid communication between said reservoir and said nozzle;

wherein said blade is an elongate flexible squeegee and said handle has a gripping portion adjacent said proximal end of handle.

25. The cleaning tool of claim 23 further comprising a spray device having a spray nozzle and reservoir, said spray device removably attached to said handle.

* * * * *